(12) United States Patent
Manasse et al.

(10) Patent No.: US 7,542,431 B2
(45) Date of Patent: Jun. 2, 2009

(54) NODAL PATTERN CONFIGURATION

(75) Inventors: Mark Steven Manasse, San Francisco, CA (US); Alice Silverberg, Columbus, OH (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 11/096,811

(22) Filed: Mar. 31, 2005

(65) Prior Publication Data

US 2006/0221860 A1 Oct. 5, 2006

(51) Int. Cl.
*H04L 12/28* (2006.01)
(52) U.S. Cl. .................................. 370/254; 370/360
(58) Field of Classification Search ............. 370/352, 370/347, 241, 396; 709/238, 233
See application file for complete search history.

(56) References Cited

U.S. PATENT DOCUMENTS

| | | | | | |
|---|---|---|---|---|---|
| 4,845,744 | A * | 7/1989 | DeBenedictis | ............ | 379/88.22 |
| 5,594,491 | A * | 1/1997 | Hodge et al. | ................ | 725/103 |
| 6,108,309 | A * | 8/2000 | Cohoe et al. | ................ | 370/241 |
| 6,134,596 | A * | 10/2000 | Bolosky et al. | ............. | 709/233 |
| 6,628,649 | B1 * | 9/2003 | Raj et al. | .................... | 370/360 |
| 6,658,002 | B1 * | 12/2003 | Ross et al. | .................. | 370/392 |
| 6,868,082 | B1 * | 3/2005 | Allen et al. | .................. | 370/360 |
| 6,965,945 | B2 * | 11/2005 | Lin et al. | ..................... | 709/242 |
| 6,976,087 | B1 * | 12/2005 | Westfall et al. | ............. | 709/238 |
| 6,999,411 | B1 * | 2/2006 | Brewer et al. | ............... | 370/220 |
| 7,251,242 | B2 * | 7/2007 | Schrodi | ....................... | 370/352 |
| 7,289,499 | B1 * | 10/2007 | Chinn et al. | ................. | 370/389 |
| 7,369,556 | B1 * | 5/2008 | Rekhter et al. | ............. | 370/392 |
| 2002/0015401 | A1 * | 2/2002 | Subramanian et al. | ...... | 370/347 |
| 2003/0084236 | A1 * | 5/2003 | Khanna et al. | ............. | 711/108 |
| 2005/0203892 | A1 * | 9/2005 | Wesley et al. | .................. | 707/3 |
| 2006/0092950 | A1 * | 5/2006 | Arregoces et al. | ........... | 370/396 |
| 2006/0215628 | A1 * | 9/2006 | Olariu et al. | ................ | 370/348 |

\* cited by examiner

*Primary Examiner*—Thong H Vu
(74) *Attorney, Agent, or Firm*—Woodcock Washburn LLP (57) ABSTRACT

Nodal pattern configuration is described, including generating successive values at a source node, processing the successive values using a plurality of intermediate nodes, sending the processed values from a node in the plurality of intermediate nodes to a destination node, and configuring the plurality of intermediate nodes such that each node of the plurality of intermediate nodes, concurrently performs at least two actions. Also, nodal pattern configuration includes generating a series of data blocks at a source node, processing data blocks from the series of data blocks using a plurality of intermediate nodes in data communication with the source node, each node of the plurality of intermediate nodes being configured to concurrently perform at least two operations, and sending processed data blocks from the plurality of intermediate nodes to a destination node, the destination node being in data communication with the plurality of intermediate nodes.

35 Claims, 11 Drawing Sheets

Even pattern:
Even time indices or steps

FIG. 2A

Odd pattern:
Odd time indices or steps

NODAL PATTERN CONFIGURATION

FIELD OF THE INVENTION

The present invention relates generally to software, and more specifically to nodal pattern configuration.

BACKGROUND OF THE INVENTION

Processing data over a network occurs in many contexts including data reconstruction, disaster recovery, storage, encryption, encoding, content serving, and others. A system's processor configuration may affect its data processing efficiency. Likewise, a processor's data communication techniques may also affect data processing efficiency. These effects may be particularly noticeable when reconstructing erroneous or lost data from a failed disk, array (e.g., RAID), or storage system (e.g., Storage Area Network (SAN) or Network Attached Storage (NAS)). For example, processor configuration may affect the throughput and latency characteristics associated with conventional communication techniques for processing data in networks.

Figure 1A:
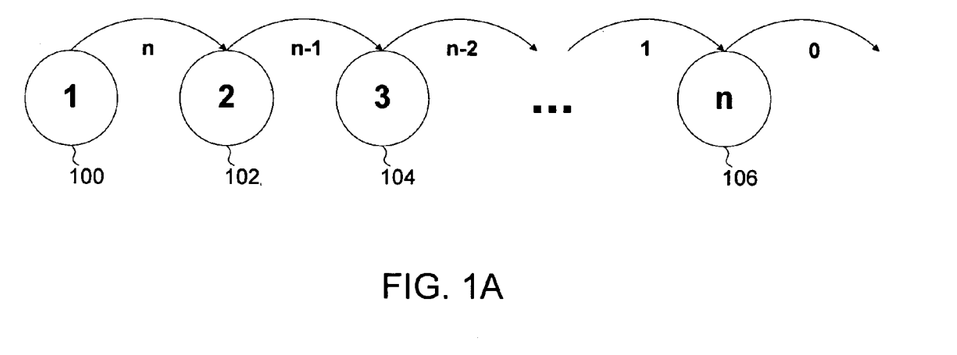
FIG. 1A illustrates a conventional tree-based nodal pattern.

FIG. 1A illustrates a conventional tree-based processor configuration. Generally, each processor may be represented by a node, and may be arranged in a network or pattern using topologies such as a switch fabric over Fibre Channel, or other similar implementations. Here, a simple tree made up of processors, or nodes, 100-106 illustrates a nodal pattern for processing blocks n, n–1, n–2, . . . 1, and 0. Processors or nodes 100-106 perform data communication and processing functions on data blocks at a given time index in a serial fashion. Data blocks may be packets, frames, segments, or other data encapsulation formats having one or more associated values. Each block may also represent a portion of a data stream. In some embodiments, nodes 100-106 represent a "bucket brigade" processor or processing system. Each node receives a value associated with a data block and performs an action (e.g., computing a function) before sending an updated value or data block to the next node in the chain.

Figure 1B:
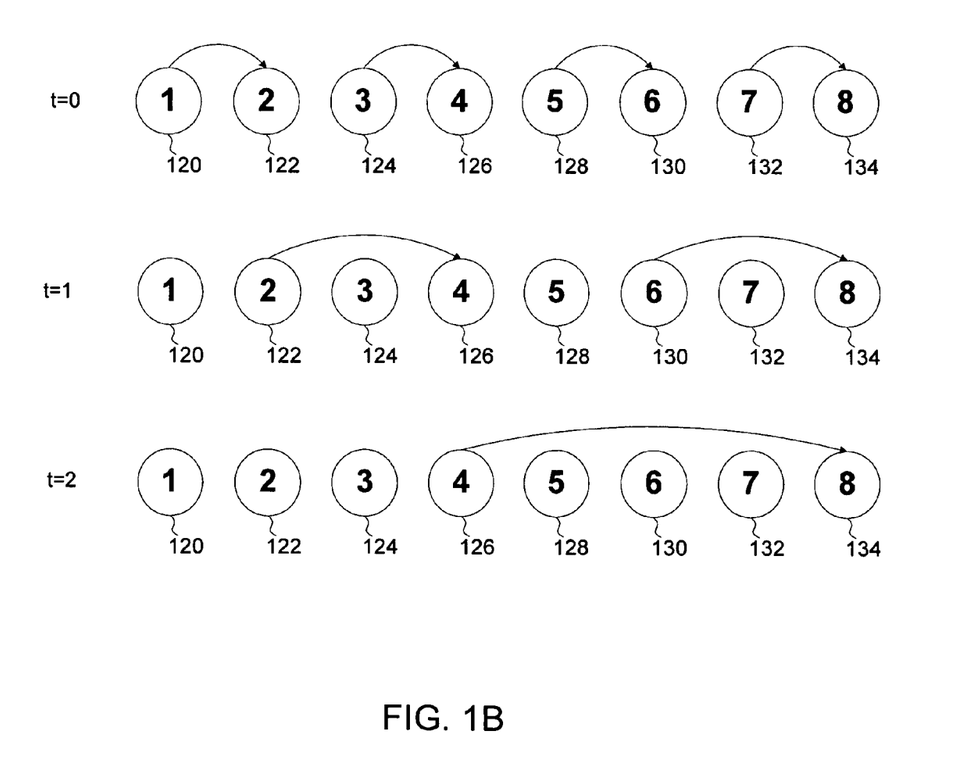
FIG. 1B illustrates a conventional extended tree-based nodal pattern.

FIG. 1B illustrates a conventional extended tree-based processor configuration. In some embodiments, the simple tree-based configuration of FIG. 1A is extended to a system of four pairs of nodes where each pair represents a parent and child node. Each node shown could be a node (an intermediate point in the tree) or a leaf (an endpoint) in the tree, and a root may be represented by a destination node, also known as a sink (not shown). Three sequential time indices, or steps, t=0, 1, and 2, during the processing of a data block, or value, are shown. At t=0, a data block is sent from odd nodes 120, 124, 128, and 132 (1, 3, 5, and 7) to even nodes 122, 126, 130, and 134 (2, 4, 6, and 8). Upon receipt by the even nodes, the value of the data blocks may be included in a computation before the next time index, or step. At t=1, the data blocks are sent from nodes 122 and 130 to nodes 126 and 134, respectively. Again, a computation may be performed on the value of the data block, thereby changing the value of the data block, at the receiving nodes. At t=2, a data block is sent from node 126 to node 134, where a final data block value is accumulated. At the next time index or step, the data block having the final accumulated result is then sent to a destination node (not shown). However, this configuration technique is inefficient because each node performs only one task (e.g., sending, receiving, storing/accumulating, performing a computation, or others). Further, low throughput is achieved (long periods of time are required to complete processing of elements of a data stream, because some nodes are repeatedly busy). While latency is also low, a computation completes quickly once started.

As a result, conventional nodal patterns configured using conventional techniques suffer from processing delays and latencies, slowing tasks such as responding to requests for data, encoding, encryption, data reconstruction, catastrophe recovery, and the like. Further, conventional configuration techniques often require the implementation of expensive and complex hardware and software to compensate for increased latency.

Thus, what is needed is a solution for improving data communication and processing capabilities without the limitations of conventional techniques.

SUMMARY OF THE INVENTION

A novel nodal pattern configuration scheme is described, including various nodal patterns and techniques for configuring nodal patterns, that overcomes several limitations of the prior art.

In some embodiments, the nodal pattern configuration scheme may include a source node configured to generate a series of data blocks, a plurality of intermediate nodes in data communication with the source node, each node of the plurality of intermediate nodes being configured to concurrently perform at least two operations, and a destination node in data communication with the plurality of intermediate nodes, the destination node being configured to receive a processed series of data blocks from the plurality of intermediate nodes.

In some embodiments, the nodal pattern configuration scheme may include a source node, a plurality of intermediate nodes in data communication with the source node, the plurality of intermediate nodes configured to process a set of values, a destination node in data communication with the plurality of intermediate nodes, the destination node configured to receive processed values of the set of values from the plurality of intermediate nodes, and a logic module for configuring the plurality of intermediate nodes such that each node of the plurality of intermediate nodes concurrently performs at least two actions.

In other embodiments, the nodal pattern configuration scheme may include generating successive values at a source node, processing the successive values using a plurality of intermediate nodes, sending the processed values from a node in the plurality of intermediate nodes to a destination node, and configuring the plurality of intermediate nodes such that each node of the plurality of intermediate nodes, concurrently performs at least two actions.

In some embodiments, the nodal pattern configuration scheme may include generating a series of data blocks at a source node, processing the series of data blocks using a plurality of intermediate nodes in data communication with the source node, each node of the plurality of intermediate nodes being configured to concurrently perform at least two operations, and sending a processed series of data blocks from the plurality of intermediate nodes to a destination node, the destination node being in data communication with the plurality of intermediate nodes.

The above embodiments are illustrative of some techniques that may be used in accordance with the principles of the present invention. Additional embodiments are set forth in the following description, are obvious from the description, or may be learned by practicing the described techniques. These embodiments may be realized and obtained by means of the implementations and combinations recited in the appended claims.

BRIEF DESCRIPTION OF THE DRAWINGS

Various embodiments of the invention are disclosed in the following detailed description and the accompanying drawings.

DETAILED DESCRIPTION OF THE PREFERRED EMBODIMENTS

Implementation of described techniques may occur in numerous ways, including as a process, an apparatus, a system, a composition of matter, a computer readable medium such as a computer readable storage medium, or a computer network wherein program instructions are sent over optical or electronic communication links.

A detailed description of one or more embodiments is provided below along with accompanying figures that illustrate the principles of the embodiments. The scope of the embodiments is limited only by the claims and encompasses numerous alternatives, modifications and equivalents. Numerous specific details are set forth in the following description. These details are provided solely for the purpose of example and the embodiments may be practiced according to the claims without some or all of these specific details.

Techniques for nodal pattern configuration are described and may be implemented to achieve reduced latency in data communication by configuring nodes to perform disparate concurrent actions. Individual nodal configurations may also be referred to herein as "nodal patterns" and may also be composed of nodal sub-patterns. Within each nodal pattern or sub-pattern, a nodal path may be defined for a data block ("block"), series of data blocks, segment, or frame of data being processed through a particular nodal pattern or sub-pattern. As used below, nodes may describe processors, processing systems, communication systems, or other discrete data communication implementations. A nodal pattern configuration may be referred to as a nodal pattern, communication system configuration, communication pattern, processor pattern, processor configuration, or the like. A nodal pattern configuration may also describe an arrangement or configuration of nodes (including a source, destination, and one or more intermediate nodes) for performing actions (e.g., receiving, sending, performing a computing function, storing or accumulating a data block or series of data blocks, and the like) at a given time index or step in a particular manner or sequence. Intermediate nodes (i.e., nodes other than a source or destination node) may be configured such that each intermediate node may concurrently perform at least two actions. The described techniques enable processing of an action, algorithm, task, or function without incurring latency such as that found in conventional techniques. The described nodal pattern configurations and configuration techniques may also be used in other contexts beyond communication processor configuration. Some embodiments include weather pattern analysis, air traffic control, network computing, and the like.

Figure 2A:
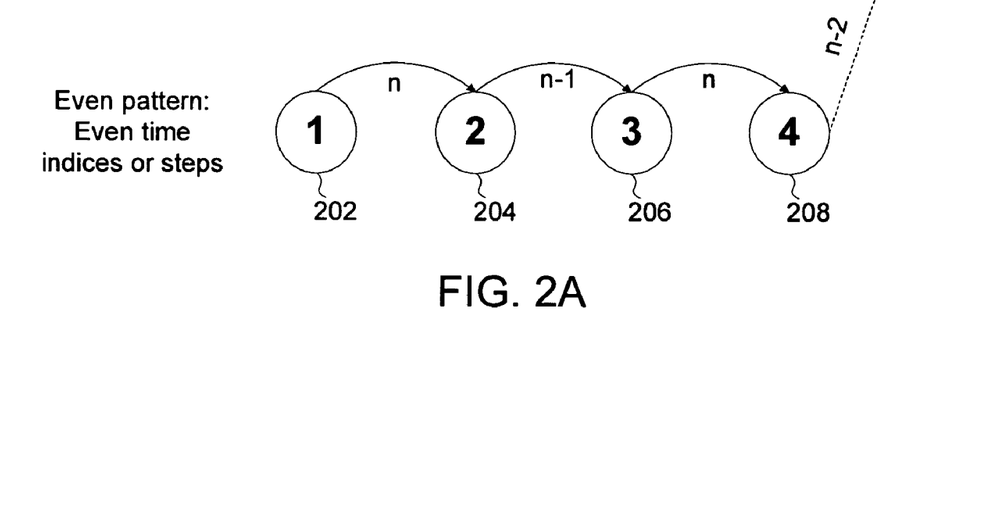
FIG. 2A illustrates an exemplary even nodal sub-pattern.
Figure 2B:
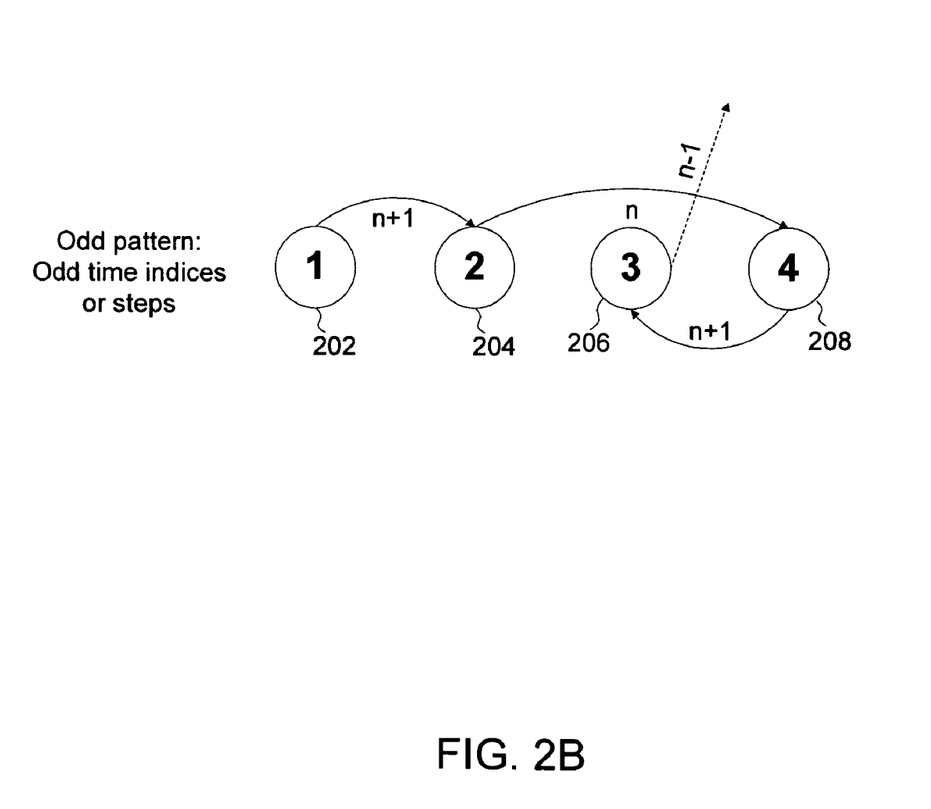
FIG. 2B illustrates an exemplary odd nodal sub-pattern.

FIGS. 2A and 2B illustrate exemplary nodal patterns. The embodiments shown in FIGS. 2A and 2B illustrate two sub-patterns within a nodal pattern, which may be described in terms of nodes 202-208, where node 202 is the source node, nodes 204-208 are intermediate nodes, and the destination node is indicated, but not shown. FIG. 2A shows an "even" nodal sub-pattern, while FIG. 2B shows an "odd" nodal pattern. These even and odd sub-patterns may be used to process data blocks (or "blocks"). In general, nodes may perform different actions on a series of data blocks, which may be labeled using data block indices, or steps (e.g., "n," "n−1," "n−2," "n+1," etc.), generating a series of processed data blocks ("processed data blocks"). In some embodiments, block indices may also be used to describe independent values associated with a given data block. In other embodiments, block indices may be used to indicate the position of values within a nodal sub-pattern or pattern at a given time index or step. A data stream may be composed of one or more data blocks, segments, frames, or the like. The described configuration techniques may include the aspect of performing various types of computations (e.g., commutative, associative, and the like).

In some embodiments, a nodal pattern may be broken into nodal sub-patterns, which describe a given system's nodal configuration. In turn, a nodal pattern may be used to describe a processor configuration, with various nodal paths (i.e., a particular route that a data block may take through a given nodal pattern or sub-pattern) for routing blocks.

FIG. 2A shows a nodal sub-pattern that may be used at even time indices, or steps (e.g., t=0, 2, 4, 6, etc.). Source node 202 and nodes 204-208 are shown. For purposes of description, nodes other than a source node or destination node may be referred to as "nodes" or "intermediate nodes." For example, starting at step t=0, source node 202 and node 206 communicate data block "n" to nodes 204 and 208, respectively (e.g., data block n from node 202 is advanced to node 204, and so on). At the same time, data block n−1, which was previously stored at node 204, is communicated to node 206, and data block n−2 (which was previously stored at node 208) is communicated to a destination node (not shown). At any given time, more than one value may be assigned to a data block.

FIG. 2B shows a nodal sub-pattern that may be used for odd time indices, or steps (e.g., t=1, 3, 5, 7, etc.). At odd time indices, for example t=1, source node 202 communicates a data block n+1 to node 204, while the data block n that was previously stored at 204 is communicated to node 208, at the same time, the data block n that was previously stored at node 208 is operated on and incremented so that it is now a data block n+1 and is communicated to node 206. The data block n−1 that was previously stored at node 206 is then sent to a destination node (not shown). At the next time index or step (i.e., an even time index or step), node 208 sends its contents (e.g., data block n) to a destination node.

A nodal pattern may be used to concurrently process different data blocks. For example, referring to FIG. 2A, at t=0, the nodal sub-pattern may concurrently process data blocks n−2, n−1, and n, by operating on and communicating (or sending) data blocks previously stored at the different intermediate nodes, while at the same time receiving data blocks at each intermediate node. By using concurrent processing, the even sub-pattern allows each intermediate node to both send and receive at any given time index (or step). A nodal pattern is "filled" when all intermediate nodes in the nodal pattern are both sending and receiving data blocks at each time index. Once all intermediate nodes 204-208 are filled, the last node, 208, outputs a data block to a destination node on every step, thereby eliminating the time associated with filling additional nodes, or creating additional latency.

In some embodiments, the processor-configuration being used is a tree-based nodal pattern, that may be modified to provide communication where each node is configured to perform more than one action at a given time index (or step) t. In other embodiments, nodal patterns (or sub-patterns) may be based on different data structures (e.g., rooted binary tree, ternary tree, and the like), expanded, repeated, or contracted using more or fewer nodes or different schedules. In some embodiments, a schedule may be used to describe the nodal path of a data block (e.g., n, n−1, n−2, n+1, n+2, etc.) prior to reaching a destination node. A schedule may also be used to describe patterns or sub-patterns at each time index or step, as well as values assigned to each data block and the various nodal paths that data blocks traverse to reach a particular destination node. Schedules may be tailored for particular tree-based nodal patterns, such as those described herein. Schedules may also be used to determine how many data blocks are to be processed, and the order of processing within a nodal pattern, sub-pattern, or nodal path, prior to sending a data block from the last node in a sub-pattern (e.g., node 208) to a destination node. Here, a nodal pattern is based on an in-place binary tree made up of a finite set of nodes ending with node 208.

Figure 3:
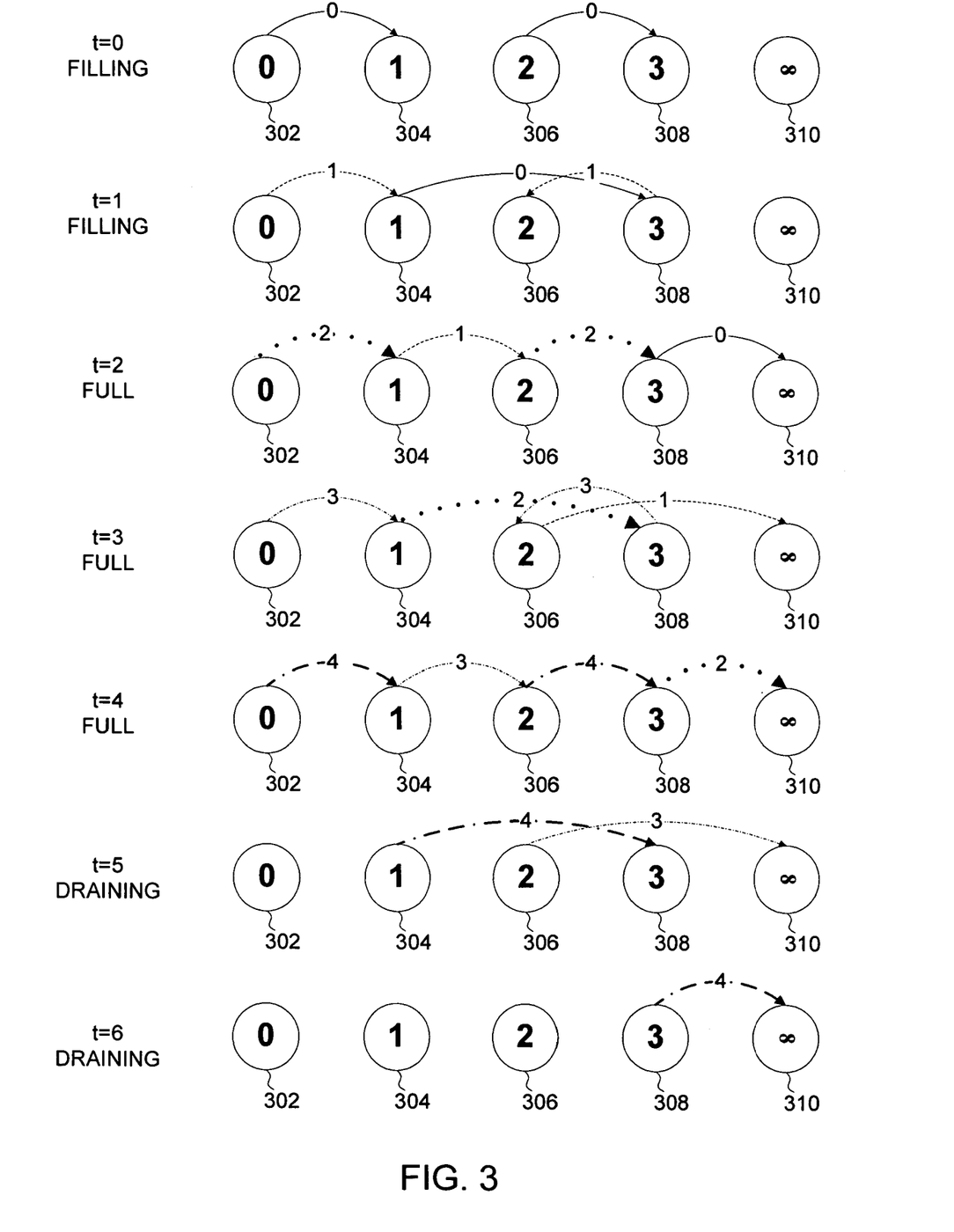
FIG. 3 illustrates an exemplary extended nodal pattern.

FIG. 3 illustrates an exemplary extended nodal pattern. In some embodiments, nodes 302-308 process data blocks 0 through 4. In other embodiments, more or fewer nodes and data blocks may be used, and the nodal pattern may be extended or repeated. Here, nodes 302-308 are shown at seven different time indices (or steps), which may be described as a sequence of steps. Here, for example, a nodal pattern may also be described as "filling," "full," or "draining." A nodal pattern is "filling" when at each step the source node sends new data blocks to the system nodes, however not all system nodes are populated with a data block so that they receive and send on every step. A nodal pattern is "full" when all intermediate nodes (which include all system nodes except source node 302, and destination node 310) are sending and receiving data blocks at a given step. A nodal pattern is "draining" when processing is being completed and data values are being sent to a destination node at every step, but the source node is no longer sending new data blocks, resulting in one or more intermediate nodes not sending and receiving at every step.

In some embodiments, at step t=0, the nodal pattern including the intermediate nodes, node 304 through node 308, is filling. Node 302 cannot fill because it is the source node. Similarly, node 310 cannot fill because it is the drain. At step t=0, data blocks "038 at nodes 302 and 306 are communicated to nodes 304 and 308, respectively. At the end of step t=0, nodes 304 and 308 are populated with data block "0," while node 306 is empty. Next, at step t=1, source node 302 communicates data block "1" to node 304 at the same time node 304 communicates is previous content, data block "0," to node 308. At the same time node 308 receives data block "0" from node 304, it also communicates its previous data block "0," which is operated on and becomes a data block "1," to node 306. At the end of step t=1 and before step t=2, nodes 304 and 306 are populated with data block "1," and node 308 is populated with data block "0." Next, at step t=2, source node 302 communicates data block "2" to node 304, while node 304 communicates its previous data block "1" to node 306. At the same time, node 306 communicates its previous data block "1," which is operated on and becomes a data block "2," to node 308, which likewise sends its previous data block "0" to the destination node 310. At the end of the time index (or step) t=2, the nodal pattern is "full" (i.e., each intermediate node, contains a data block and is sending and receiving on each subsequent step). If source node 302 continues to send data blocks, the nodal pattern remains full. At times t=3 and t=4, the nodal pattern remains full. Following the time index, or step, at time t=4, nodes 304 and 308 are populated with data block "4," and node 306 is populated with data block "3."

At t=5, the nodal pattern begins to drain. Thus, at t=5, the source node 302 does not send a new data block. The data block "4" at node 304 is communicated to node 308, and the data block "3" at node 306 is communicated to destination node 310. Following time index (or step) t=5, nodes 302, 304, and 306 are empty, while node 308 is populated with data block "4." At step t=6, nodes 302, 304, and 306 remain empty, and communicate nothing. Node 308 communicates data block "4" to destination node 310. Following step t=6, the nodal pattern is fully drained. Here, five data blocks (data blocks 0-4) were processed, but in other embodiments, an arbitrary number of data blocks may be processed, generating a processed series of data blocks, and there is no limitation to any specific number of data blocks. This nodal pattern may be extended, contracted, or repeated in other embodiments. Additionally, each intermediate node, nodes 304-308 may be configured to perform more than one action at any given time index (or step).

At each of the time indices (or steps) shown, various nodes may concurrently perform more than one function. In some embodiments, at t=1, nodes 304 and 308 are concurrently sending and receiving different data blocks. Processor efficiency is positively affected when each node, or processor, performs multiple actions at a given time index or step while using a constant number of nodes. Here, latency is minimized and processor throughput is maximized.

Still referring to FIG. 3, in some embodiments, for any time indices (or steps) where node 308 sends its current data block to the destination node, an action changing the value contained in that current data block may be performed on the data block before sending it to the destination node. In some embodiments, before sending the current data block to the destination node, node 308 applies a mathematical function to the value of the current data block (e.g., an accumulating or summing function). Other actions may include adding a stored value to the received value of the current data block, reading a value from a physical storage device and adding that to the value of the current data block, or computing a function such as a mathematical operation (e.g., binary arithmetic functions such as exclusive-or "XOR", or the like). These actions may be useful in applications such as data recovery, storage, computing, routing, and executing a set of algorithms, and the like.

Figure 4A:
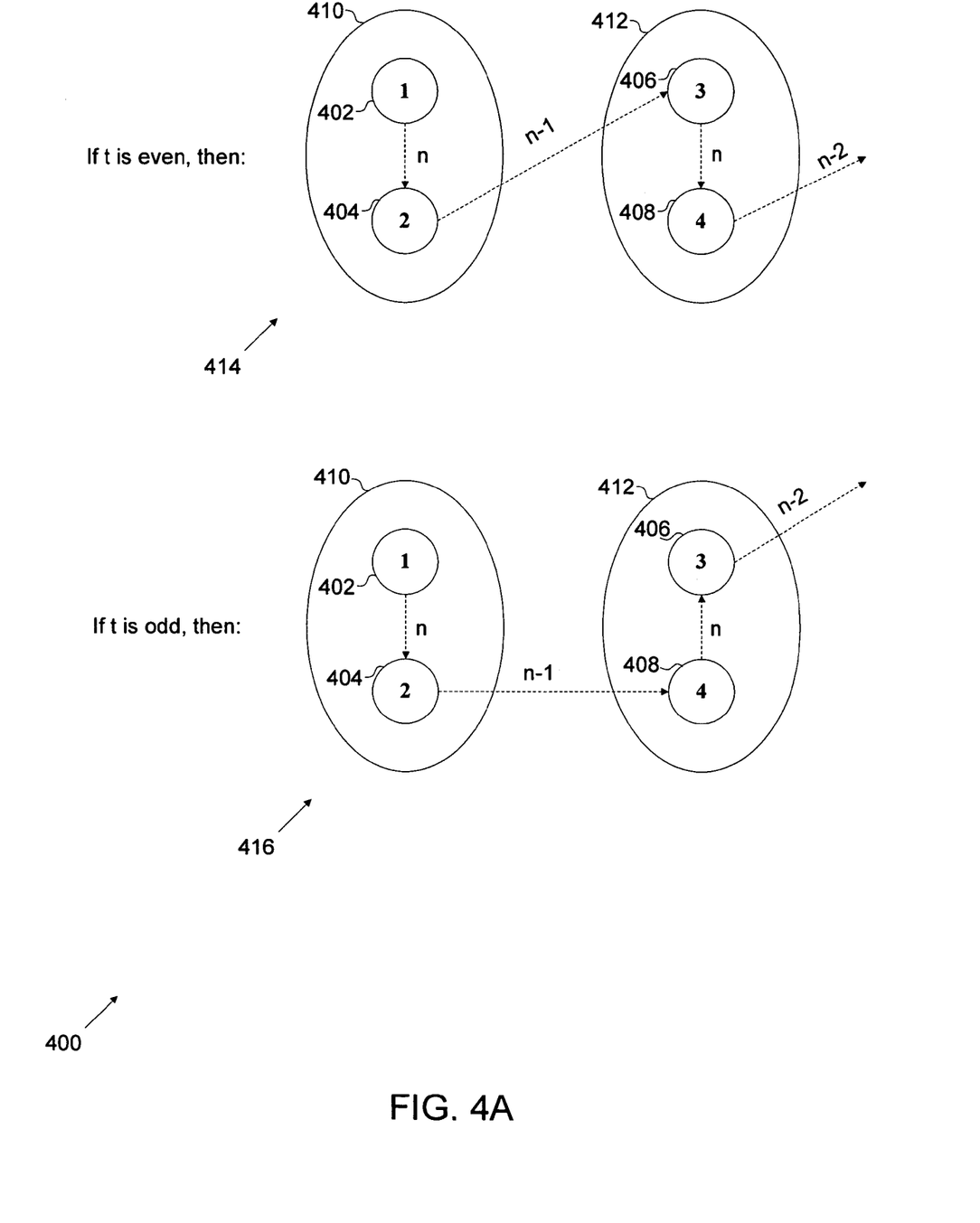
FIG. 4A illustrates an exemplary doubled nodal pattern.

FIG. 4A illustrates an exemplary doubled nodal pattern. Here, nodes 402-408 are doubled from a two-process configuration to a four-processor configuration. Four processors are enclosed in "bubbles" 410 and 412. Nodes 402 and 404 replace a single node, and are able to perform twice as many actions as may have previously been performed by the single node. Likewise, nodes 406 and 408 replace a single node, and are able to perform twice as many actions as previously performed by the single node. In some embodiments, data blocks may be routed through two different processing configurations of the same nodal pattern for even and odd-numbered time indices (or steps). A data block may have an indication (e.g., header information or data, handling instructions for a given data block, and the like) that indicates how a particular data block is to be processed or the nodal path for a given data block. In some embodiments, each pattern may be implemented on an alternating basis, depending upon whether a given time index or step is even or odd. At initialization, t=0, and even time indices thereafter (steps) t=2, 4, 6, 8, 10, etc., the "even" pattern shown in FIG. 4A may be used. This pattern resembles the even pattern shown in FIG. 2A, and discussed in connection with FIG. 2A. At odd time indices (or steps) t=1, 3, 5, 7, 9, etc., the "odd" pattern shown in FIG. 4A may be used. Likewise, this pattern resembles the odd pattern shown in FIG. 2B, and discussed in connection with FIG. 2B.

Nodal pattern 400 is different from the nodal pattern described in FIGS. 2A and 2B because bubbles 410 and 412 have two nodes each, rather than the single nodes shown in the embodiments illustrated in FIGS. 2A and 2B. Bubbles 410 and 412 can use both nodes to simultaneously process data blocks (e.g., 402 and 404, 406 and 408 can work to process data blocks at the same time). Bubbles 410 and 412 may be substituted for nodes 202-208 in FIG. 2. Using the configuration of bubbles 410 and 412, nodal pattern 400 provides twice the processing capabilities of the single node arrangement in a nodal pattern. In some embodiments, if t=0, or t is an even time index or step, then a data block n may be routed in accordance with even nodal sub-pattern 414. If t is an odd time index or step, then data blocks may be routed according to odd nodal sub-pattern 416.

In other embodiments, the number of nodes may be extended further, using any number of nodes, arbitrary or otherwise, to scale to support network and processing requirements. This process may be repeated or recursively looped. By doubling each node, processing efficiency in terms of throughput is increased. Using this doubled nodal pattern, latency is increased above the single node nodal pattern shown in FIGS. 2 and 3, however, it is still reduced below latency associated with conventional patterns such as those described in connection with FIG. 1A. An extended embodiment using a doubled nodal pattern is described in connection with FIG. 4B.

Figure 4B:
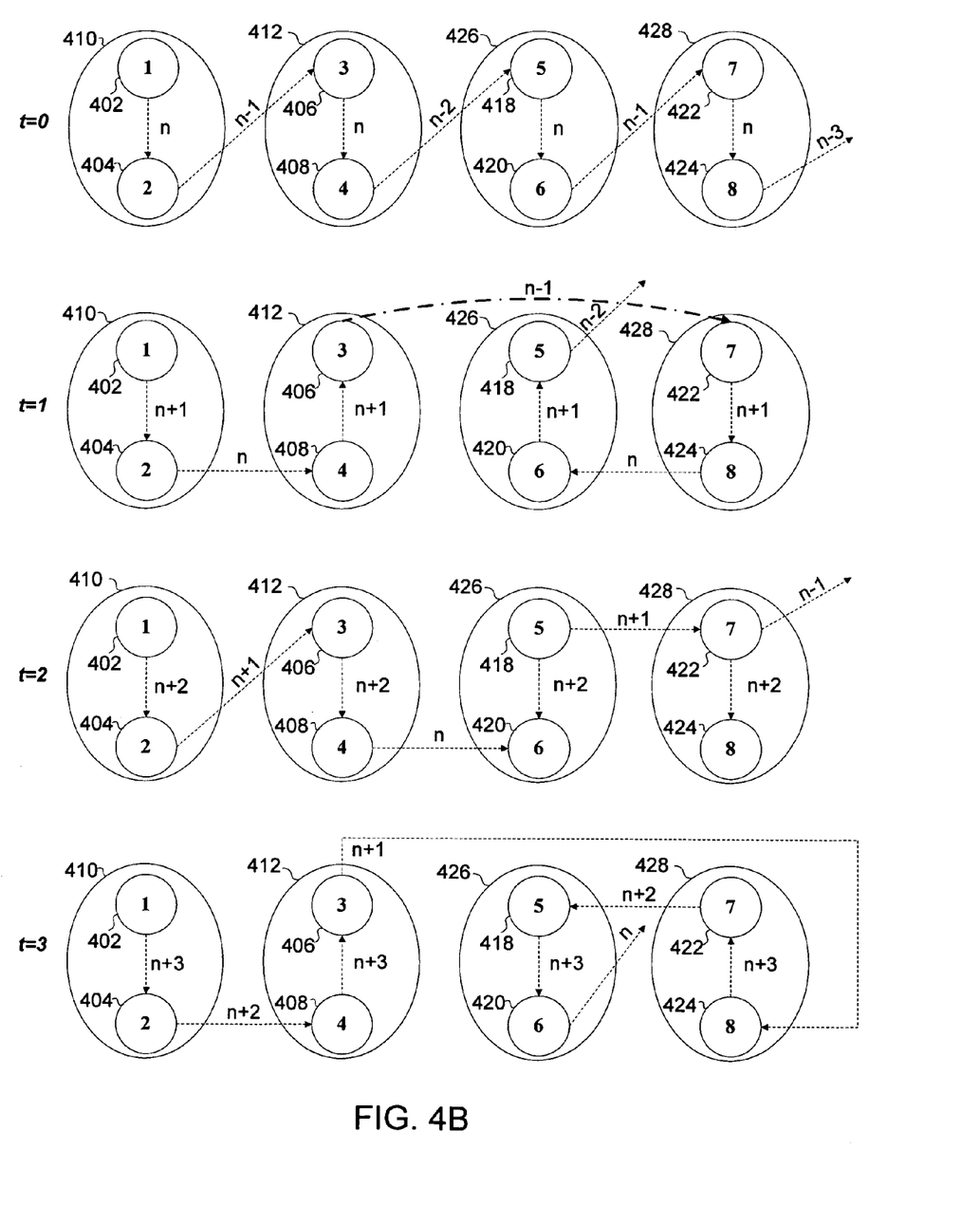
FIG. 4B illustrates an exemplary extended doubled nodal pattern.

FIG. 4B illustrates an exemplary extended doubled nodal pattern. Here, nodal pattern 400 is extended over 4 time indices, or steps (t=0-3). In addition to nodes 402-408 and bubbles 410 and 412, nodal patterns 414 and 416 are repeated, resulting in the addition of nodes 418-424 in bubbles 426 and 428. Pairs of nodes in FIG. 4B correspond to single nodes in FIG. 4A: group 410 of FIG. 4B corresponds to node 402 of FIG. 4A; 412 corresponds to 404, 426 to 406, and 428 to 408. The edge labeling between groups in FIG. 4B match the edge labels in FIG. 4A with one extra unit of delay, due to the increased latency from doubling the total number of nodes. In some embodiments, at t=0, data block n is communicated from nodes 402 to 404, within bubble 410. At the same time that data block n arrives at node 404, node 404 communicates its previously stored data block n−1 to node 406 in bubble 412. At the same time, node 406 increments its previously stored data block n−1 to data block n, and communicates it to node 408, also in bubble 412. Node 408 communicates its previously stored data block n−2 to node 418 in bubble 426, which increments its previously stored data block to data block n and communicates it to node 420 also in bubble 426. Node 420 communicates its previously stored data block n−1 to node 422 in bubble 428. Node 422 operates on and increments its previously stored data block to data block n and communicates it to node 424, which sends its previously stored data block n−3 to the destination node (not shown). Next, at step t=1, source node 402 communicates new data block n+1 to node 404, which at the same time sends its previous data block n to node 408 in bubble 412. The data block n previously stored in node 408 is operated on and incremented to data block n+1 and communicated to node 406, also in bubble 412. At the same time, node 406 communicates data block n−1 to node 422 in bubble 428. Node 422 operates on and increments its previously stored data block n−1 to data block n+1 and communicates it to node 424, also in bubble 428. Also at the same time, node 424 communicates its previously stored data block n to node 420, which is located in bubble 426, and node 420 increments its previously stored data block n to data block n+1 and communicates that data block to node 418, also in bubble 420. Data block 418 communicates its previously stored data block n−2 to the destination node (not shown). At the conclusion of step t=1 and before step t=2, except for source node 402, both nodes in each bubble contain a data block, and twice as much data has been moved between nodes as in a comparable t=1 step of a non-doubled, single node pattern. In a similar way, at steps t=2 and t=3, the data block stored in each node in each bubble are concurrently transferred to their next respective location, and where necessary operated on (e.g., incremented). For subsequent data blocks n+1, n+2, and n+3, different path may be used.

In other embodiments, at step t=1, data block n+1 is sent from node 402, 408, 420, and 422 to nodes 404, 406, 418, and 424, respectively. A nodal path is a specific route that a particular data block follows through a given nodal pattern or sub-pattern. At t=2, data block n+1 is sent from node 404 in bubble 410 to node 406 in bubble 412, and from node 418 in bubble 426 to node 422 in bubble 428. At step t=3, data block n+1 is then sent from node 406 in bubble 412 to node 424 in bubble 428. If the nodal path in this embodiment was extended further, at t=4, data block n+1 would be sent from node 424 in bubble 428 to the destination node, following a nodal path similar to that followed by data block n−3 at t=0.

Data block n+2 follows a different nodal pattern through the nodal sub-patterns shown in FIG. 4B. The nodal path that data block n+2 follows is different than the nodal paths followed by data blocks n and n+1. At t=2, data block n+2 is sent from nodes 402, 406, 418, and 422 to nodes 404, 408, 420, and 424, respectively. At t=3, data block n+2 is sent from node 404 in bubble 410 to node 408 in bubble 412 and from node 428 in bubble 428 to node 418 in bubble 426. If the nodal pattern were extended, then data block n+2 would follow the same nodal path to the destination node as followed by data block n−2 at step t=1. Likewise, assuming the nodal pattern were extended by time indices (or steps), t=4, t=5, and t=6, data block n+3 would follow the same nodal path to the destination node as followed by data block n−3 at time index t=0.

A series of nodal paths for data blocks n, n+1, n+2, and n+3 may be repeated for any number of data blocks in a given data stream. The nodal pattern provides doubled processor capability in each of bubbles 410, 412, 426, and 428, but adds only a single unit of latency for each bubble. Further, processing efficiency is increased because intermediate nodes, nodes 404-424, are configured to concurrently perform at least two actions. The communication between pairs of nodes inside each bubble is oriented so that the block entering the bubble is received by the node in the bubble which had received the local value of that block on previous time steps, with the new data block initiating processing on that time step being sent from the aforementioned node to the other node in the bubble.

Figure 5A:
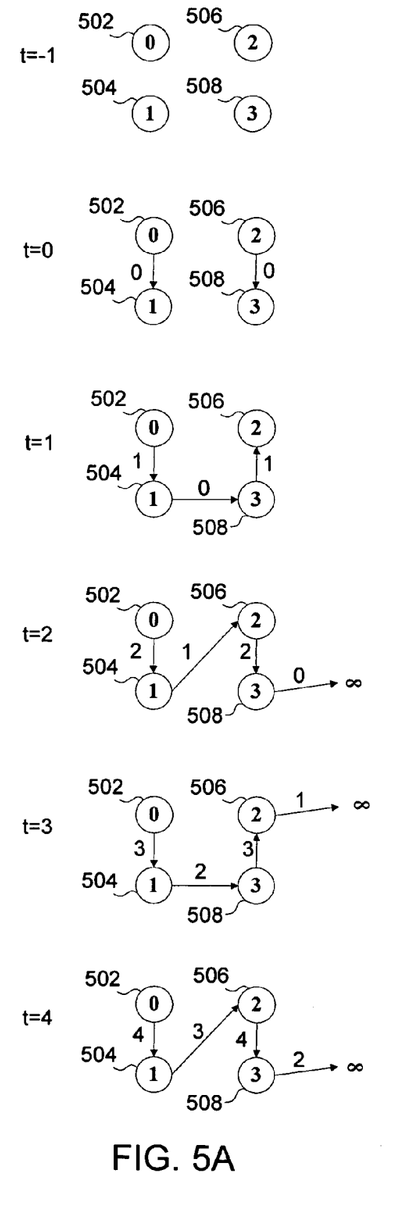
FIG. 5A illustrates another exemplary nodal pattern.
Figure 5B:
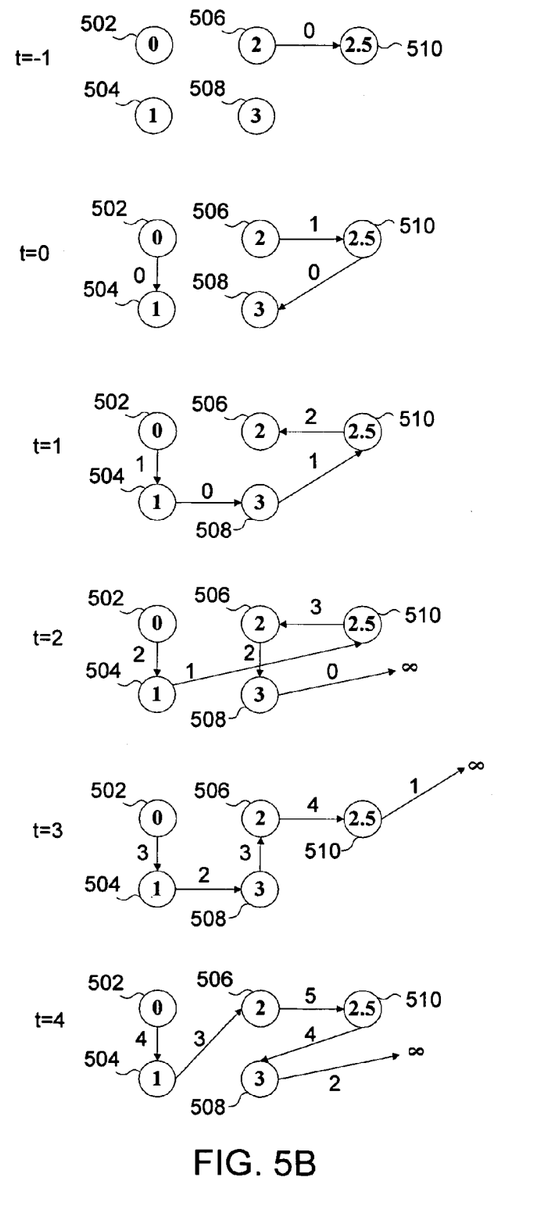
FIG. 5B illustrates adding a node to an exemplary nodal pattern.

In addition to doubling, further nodes may be added to create an arbitrary number of nodes, as illustrated in FIGS. 5A and 5B.

FIG. 5A illustrates another exemplary nodal pattern; the use of four nodes is an example. An arbitrary number of nodes may be used. FIG. 5A and FIG. 5B illustrates a basic transformation resulting in a nodal configuration with one additional node. In some embodiments, four nodes 502-508 are configured to perform two or more actions during the processing of data blocks 0-4 over time indices (or steps) t=−1 to 4. At t=2-4, the nodal sub-patterns within the nodal pattern alternately send accumulated values for data blocks 0-2 to a destination node. The nodal pattern in FIG. 5 is similar to the nodal patterns in FIGS. 2A and 2B, and to the extended nodal pattern illustrated in FIG. 3. In contrast, a node may be added to a nodal pattern, as shown in FIG. 5B. Additional nodes may change the nodal patterns, sub-patterns, or nodal paths.

FIG. 5B illustrates the process of adding a node to an exemplary nodal pattern. In some embodiments, an additional node 2.5 510 is added to existing nodes 502-508. In other embodiments, an additional node may be added between, before, or after, different existing nodes, thereby resulting in additional nodes 0.5, 1.5, or 3.5, for example. Adding an additional node may (as it does in the illustrated example) also add an additional unit of latency, which means it will take an additional time index or step for the nodal path to become "full" so that each intermediate node sends and receives a data block at each subsequent time index (or step). In some embodiments, using the added node 510, the nodal pattern of FIG. 5B may include one additional time index (or step), t=−1 (where t =−1 represents the time index or step prior to an initialization time index or step). The additional time index (or step) enables the nodal pattern to be filled as compared to the nodal pattern of FIG. 5A. Thus, additional step t=−1 is added (Adding node 2.5 and nodes 0.5, 1.5, and 3.5 to FIG. 5B would not require the addition of an extra time step). At step t=−1, data block 0 is sent from node 506 to the added node 510. At t=0, data block 1 is sent from node 502 to node 504, while the data block previously stored in node 504 is communicated to node 508. The data block 0 that was stored in 508 is operated on and incremented to data block 1 then communicated to added node 510, while data block 1 that was stored in added node 510 is communicated to node 506. Next, at t=2, data block 0 is sent from node 508 to a destination node (not shown). Here an odd number of nodes are shown, although the pattern repeats every four steps. In other embodiments, a different nodal pattern may be used.

In some embodiments, the nodal path for data block 0 (through the nodal pattern of FIG. 5B) begins when node 506 initially communicates data block 0 to node 510 at t=−1. At t=−1, node 506 acts as a source node for sending data block 0 to node 510. At t=0, data block 0 is communicated from node 502 to node 504 and from node 510 to node 508. At t=1, data block 0 is communicated from node 504 to node 508. At t=2, data block 0 is sent from node 508 to destination node ∞. For purposes of further illustration, additional embodiments of the recursively looping pattern at t=3 and t=4 are provided. In other embodiments, the nodal pattern may be extended. Also, more or fewer nodes may be used, which will expand or contract the nodal pattern. As with the embodiment shown in FIG. 5A, each intermediate node performs both a send and receive action, as described above. Another characteristic for the nodal patterns illustrated in FIGS. 5A and 5B is that, despite the additional node, the pattern may be repeated over a definable period.

In some embodiments, the definable period of repetition for block processing in the nodal pattern of FIGS. 5A and 5B (despite the additional node in the FIG. 5B nodal pattern) for an extended nodal pattern may be described by the mathematical formula: $2^{\lceil \log_2 \log_2 n \rceil}$. In other embodiments, the period of repetition may be defined differently, depending upon the number of nodes, type of nodal pattern, and other parameters.

FIGS. 2-5 provide embodiments for implementing the techniques described herein. In other embodiments, parameters associated with nodal patterns may be modified, added, or deleted. For example, in lieu of an in-place binary tree, a ternary tree (i.e., a tree built upon a pattern of a parent node having three children nodes) may be used to increase throughput and reduce latency. For example, using the techniques described above, throughput is increased because each node (with the exception of the source node) is simultaneously sending and receiving and latency is reduced to $\log_2 n$. However, by using another tree-based nodal pattern such as a ternary tree or a binary rooted tree, throughput and latency may be further modified. Some embodiments of processes for implementing the above techniques are described in greater detail below in connection with FIGS. 6-9.

Figure 6:
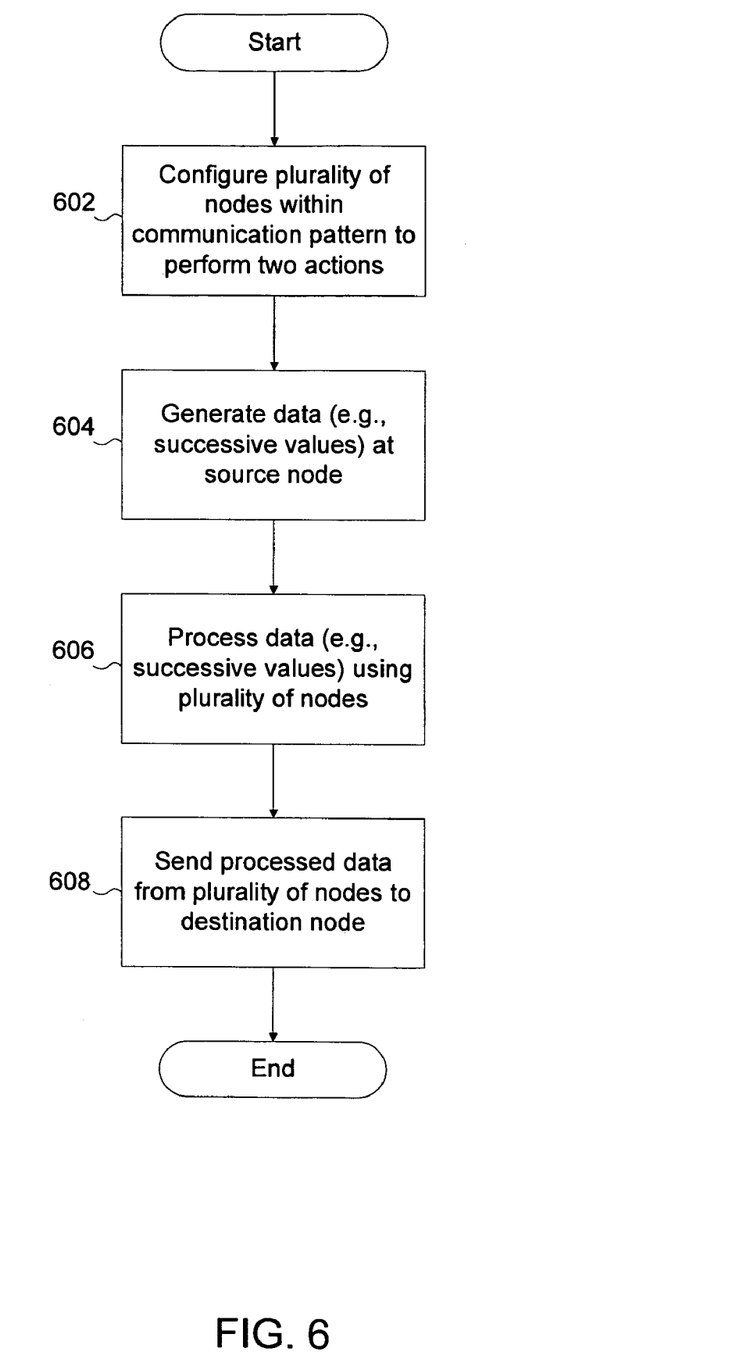
FIG. 6 is a flow chart illustrating an exemplary overall process for configuring a nodal pattern.

FIG. 6 is a flow chart illustrating an exemplary overall process for nodal pattern configuration. In some embodiments, a nodal pattern may be used to determine how a set of nodes may be configured to perform various actions using data values. Here, a plurality of intermediate nodes may be configured within a nodal pattern to process data blocks in order to perform concurrent actions (602). Examples of actions may include send, receive, or perform a programmed operation (e.g., addition, subtractions, etc.). Once configured, data (e.g., a data block, set of values within a data stream, successive values, and the like) may be generated at a source node (604). Data may be processed using the plurality of intermediate nodes (606). The processed data is sent from the plurality of intermediate nodes to a destination node (608). In some embodiments, nodal patterns or sub-patterns may be used to process a set of values associated with data blocks in a data stream (604). Nodal patterns may be configured according to the above-described techniques.

Figure 7:
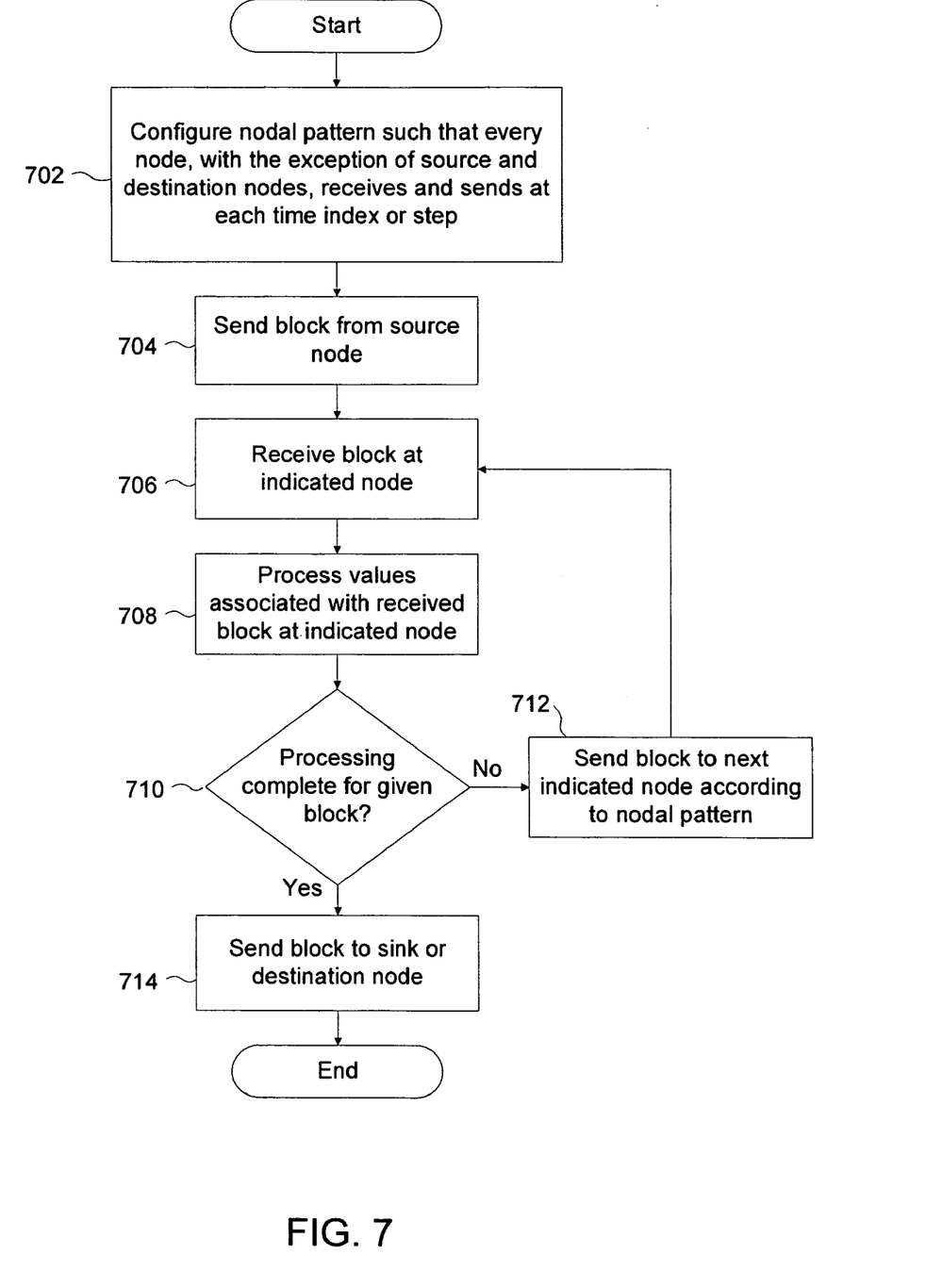
FIG. 7 is a flow chart illustrating an alternative exemplary process for configuring a nodal pattern.

FIG. 7 is a flow chart illustrating an alternative exemplary process for nodal pattern configuration. Here, a nodal pattern is configured such that each intermediate node is configured to receive and send data values associated with a given data block at a particular time index or step (702). Once a nodal pattern has been filled (see FIG. 3), each intermediate node receives and sends data blocks. Once configured, a data block is sent from a source node at an initial time index (or step) (704). The data block is then received at the first indicated node in the nodal pattern (706). Once received, a value or set of values may be processed at the receiving or indicated node in the nodal pattern (708). A determination is made as to whether processing for the data block is complete (710). If processing is not complete, then the data block is sent to the next indicated node in the nodal pattern (712). Some embodiments of nodal patterns are provided in connection with the above descriptions for FIGS. 2-5B. If processing is complete, then the data block is sent to a destination node (714).

Figure 8:
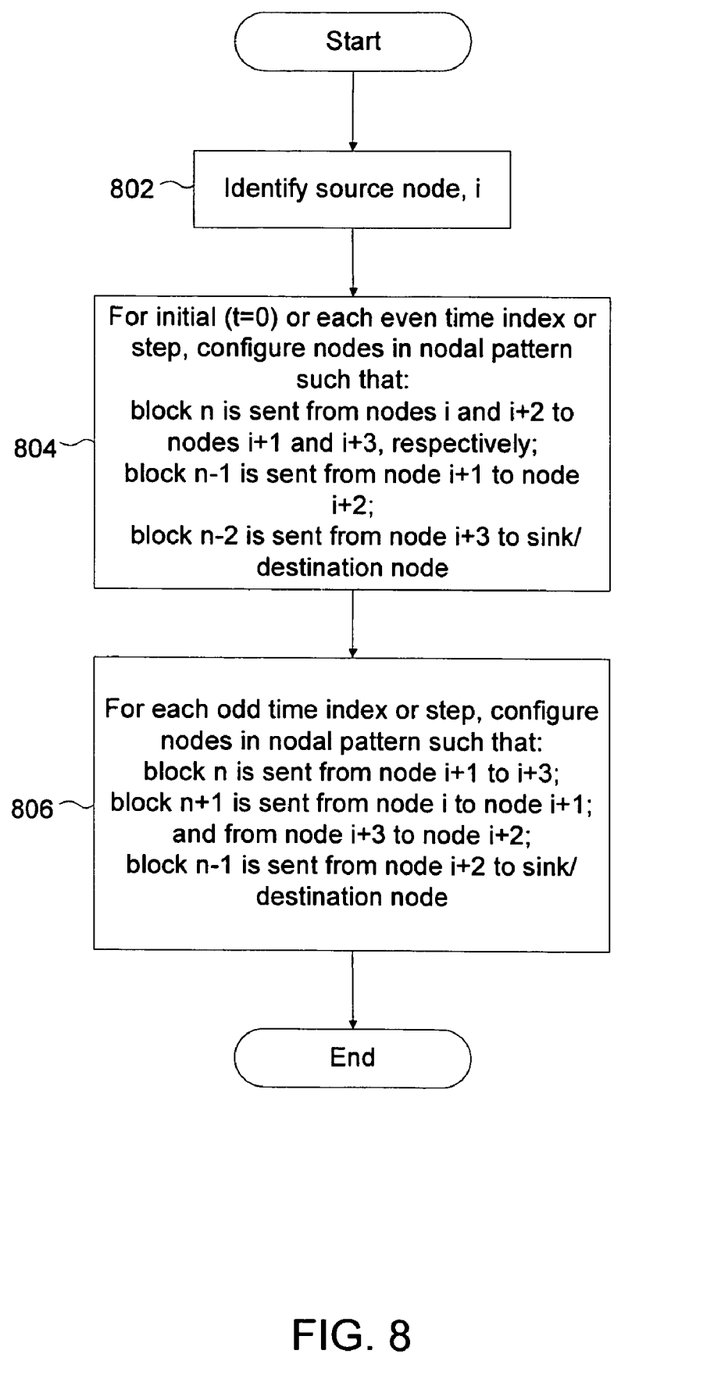
FIG. 8 is a flow chart illustrating an exemplary process for configuring a nodal pattern.

FIG. 8 is a flow chart illustrating an exemplary process for configuring a nodal pattern. In some embodiments, a source node i is identified (802). For an initial or even time index (or step) t the nodal pattern (i.e., nodes in the nodal pattern) is configured such that, when filled (i.e., each node is receiving and sending data blocks), data block n is sent from nodes i and i+2 to nodes i+1 and i+3, respectively, data block n−1 is sent from node i+1 to node i+2, and data block n−2 is sent from node i+3 to a destination node (804). Next, for each odd time index or step, the nodal pattern is configured such that data block n is sent from node i+1 to i+3, data block n+1 is sent from node i to node i+1 and from node i+3 to node i+2, and data block n−1 is sent from node i+2 to a destination node (806). In other embodiments, different configurations may be used, extended, modified, scaled, or reduced to accommodate various types of actions, such as computing a function. In other embodiments, different types of functions may require different nodal patterns of nodes. An exemplary processor for performing the above-described techniques is described in connection with FIG. 9.

Figure 9:
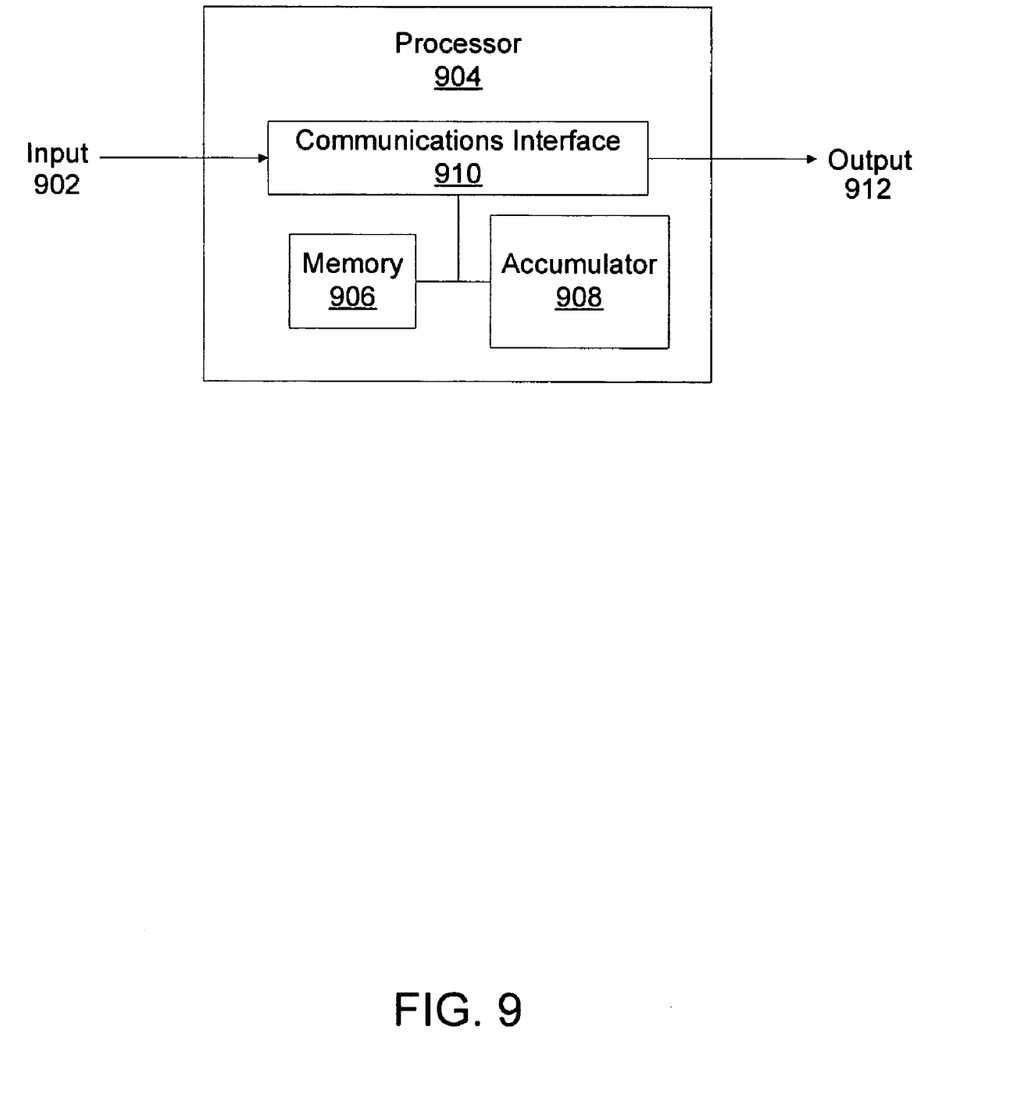
FIG. 9 is a block diagram of an exemplary processor.

FIG. 9 is a block diagram of an exemplary processor suitable for use according to some embodiments. In some embodiments, processors may be used to implement techniques such as those used in FIGS. 2-8. Using software, hardware, or a combination thereof, nodal configuration techniques may be implemented using processors. Here, an input (e.g., block, packet, frame, segment, etc.) is sent from a sending or source node to processor 904. Included with processor 904 are memory 906, accumulator 908, and communications interface 910, which enables output 912. Processor 904 may be implemented using a processing device or system such as those found in a computer, server, client, mainframe, or minicomputer. Processor 904 may also be implemented as either hardware, software, or any combination thereof. Exemplary software may include a set of logical instructions which, when executed, may establish one of the above-described nodal patterns. Memory 906 may be implemented using a storage device or system such as a disk drive, disk or array of disks (e.g., RAID), attached (e.g., NAS) or non-attached storage (e.g., floppy disk, CD-ROM, DVD), and the like. Accumulator 908 provides capabilities for processor 904 to receive multiple inputs over multiple time index or steps, aggregate blocks of data for a particular index, and generate an output. Other functions besides aggregation, addition, summing, and the like may be performed.

Input 902 and output 912 may be taken from a variety of devices, including other processors or other devices and systems within or outside of a given network. Processor 904 may be further implemented as a standalone component or as a part of an overall larger system. An exemplary system for providing an implementation environment for processor 904 is shown in FIG. 10.

Figure 10:
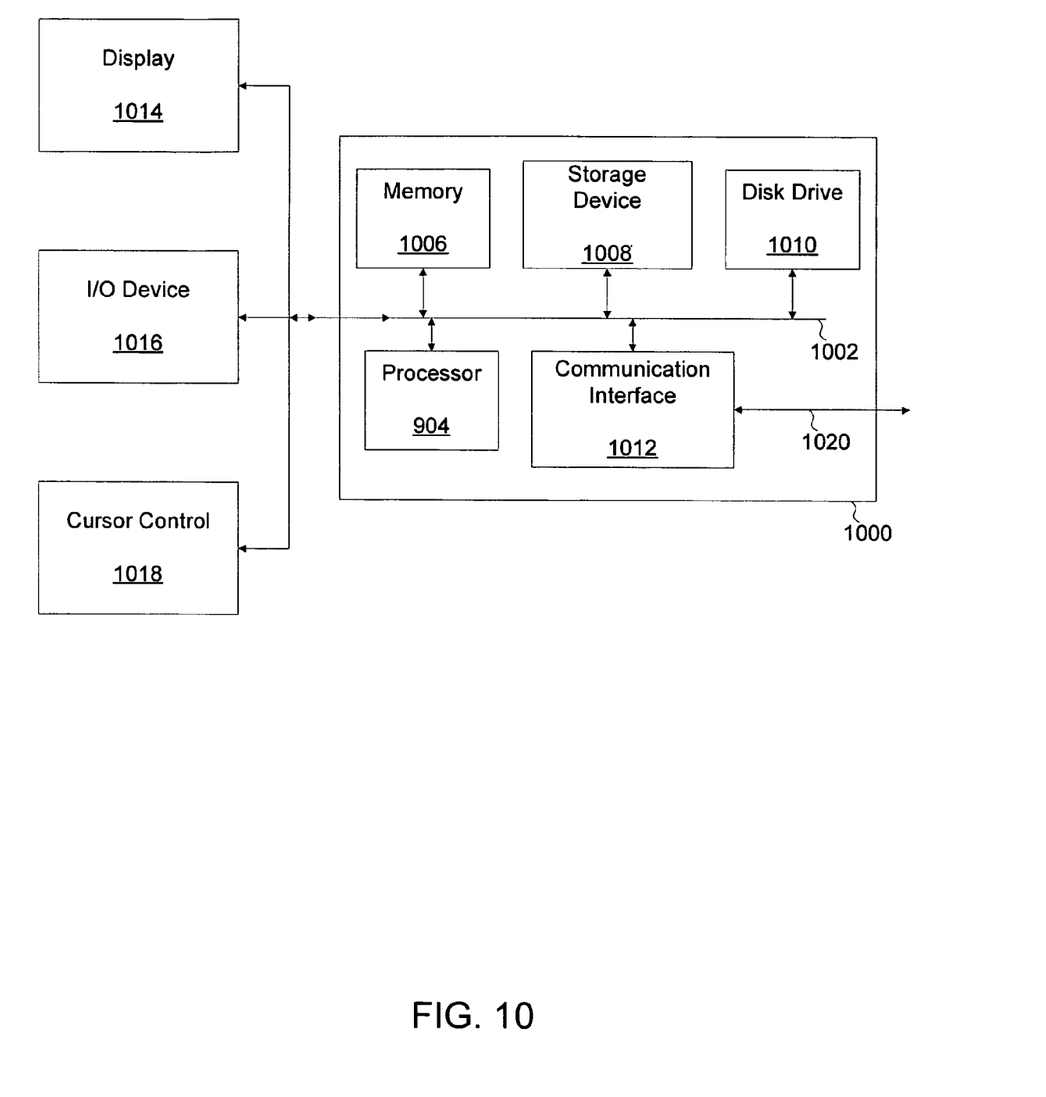
FIG. 10 is a block diagram illustrating an exemplary computer system suitable for configuring a nodal pattern.

FIG. 10 is a block diagram illustrating an exemplary computer system suitable for nodal pattern configuration in accordance with some embodiments. Computer system 1000 includes a bus 1002 or other communication mechanism for communicating information, which interconnects subsystems and devices, such as processor 1004, system memory 1006 (e.g., RAM), storage device 1008 (e.g., ROM), disk drive 1010 (e.g., magnetic or optical), communication interface 1012 (e.g., modem or Ethernet card), display 1014 (e.g., CRT or LCD), input device 1016 (e.g., keyboard), and cursor control 1018 (e.g., mouse or trackball).

According to some embodiments of the invention, computer system 1000 performs specific operations by processor 1004 executing one or more sequences of one or more instructions stores in system memory 1006. Such instructions may be read into system memory 1006 from another computer readable medium, such as static storage device 1008 or disk drive 1010. In alternative embodiments, hard-wired circuitry may be used in place of or in combination with software instructions to implement the invention.

The term "computer readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as disk drive 1010. Volatile media includes dynamic memory, such as system memory 1006. Transmission media includes coaxial cables, copper wire, and fiber optics, including wires that comprise bus 1002. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments, execution of the sequences of instructions to practice the invention is performed by a single computer system 1000. According to other embodiments of the invention, two or more computer systems 1000 coupled by communication link 1020 (e.g., LAN, PSTN, or wireless network) may perform the sequence of instructions to practice the invention in coordination with one another. Computer system 1000 may transmit and receive messages, data, and instructions, through communication link 1020 and communication interface 1012. Received program code may be executed by processor 1004 as it is received, and/or stored in disk drive 1010, or other non-volatile storage for later execution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A system for configuring a nodal pattern, the system comprising:
   a source node configured to generate a series of data blocks;
   a plurality of intermediate nodes in data communication with the source node, each intermediate node of the plurality of intermediate nodes being configured to concurrently perform at least two operations;
   a destination node in data communication with the plurality of intermediate nodes, the destination node being configured to receive processed data blocks from the plurality of intermediate nodes; and
   a plurality of doubled nodes and a time index, wherein each node in the nodal pattern is doubled thereby generating the plurality of doubled nodes, each doubled node being configured to process more data blocks in each time of the time index than could be processed by each node in the plurality of intermediate nodes.

2. The system recited in claim 1, wherein the destination node is in data communication with the plurality of intermediate nodes and the source node.

3. The system recited in claim 1, wherein the at least two operations are receiving and transmitting data blocks from the series of data blocks.

4. The system recited in claim 1, wherein the series of data blocks include successive values.

5. The system recited in claim 1, further comprising a sub-pattern of the nodal pattern wherein the sub-pattern includes a schedule of operations to be performed on the series of data blocks.

6. The system recited in claim 1, further comprising a sub-pattern of the nodal pattern, wherein the sub-pattern is defined by a schedule of operations to be performed on the series of data blocks.

7. The system recited in claim 1, wherein an additional node is added to the plurality of intermediate nodes.

8. The system recited in claim 7, further comprising a time index, wherein the additional node enables the plurality of intermediate nodes to process more data blocks at each time in the time index than the plurality of intermediate nodes could process without the additional node.

9. A system for configuring a nodal pattern, the system comprising:
    a source node;
    a plurality of intermediate nodes in data communication with the source node, the plurality of intermediate nodes configured to process a set of values;
    a destination node in data communication with the plurality of intermediate nodes, the destination node configured to receive processed values of the set of values from the plurality of intermediate nodes;
    a logic module for configuring the plurality of intermediate nodes such that each intermediate node of the plurality of intermediate nodes concurrently performs at least two actions; and
    a first and a second sub-pattern of the nodal pattern, wherein at least one node of the plurality of intermediate nodes is configured to receive a first value associated with the first sub-pattern and transmit a second value associated with the second sub-pattern.

10. The system recited in claim 9, farther comprising a first sub-pattern of the nodal pattern, wherein at least one node in the plurality of intermediate nodes is configured to receive a first value according to the first sub-pattern.

11. The system recited in claim 10, farther comprising a second sub-pattern of the nodal pattern, wherein at least one node in the plurality of intermediate nodes is configured to send a second value according to the second sub-pattern.

12. The system recited in claim 9, wherein the at least two actions are selected from a list of actions including receiving the value from the set of values, transmitting the value, performing a computation using the value, and sending the value to a destination node.

13. The system recited in claim 12, wherein the computation is a binary computation.

14. The system recited in claim 12, wherein each node of the plurality of intermediate nodes may perform the computation by applying a value to a stored value as either a left or right operand.

15. The system recited in claim 12, farther comprising a sub-pattern of the nodal pattern wherein the sub-pattern includes a schedule for performing the at least two actions by the plurality of intermediate nodes.

16. The system recited in claim 9, further comprising a sub-pattern of the nodal pattern, the sub-pattern being configured to receive and send values from the set of values.

17. The system recited in claim 9, wherein each node of the plurality of intermediate nodes receives an indication included in a value, the indication providing handling instructions for the value.

18. The system recited in claim 17, wherein the indication is header information.

19. The system recited in claim 9, further comprising a time index, wherein each node of the plurality of intermediate nodes receives and sends values at each time in the time index.

20. The system recited in claim 9, further comprising a plurality of doubled nodes and a time index, wherein each node in the nodal pattern is doubled, thereby generating the plurality of doubled nodes, the plurality of doubled nodes processing twice an amount of values from the set of values as could be processed by the plurality of intermediate nodes at any given time in the time index.

21. The system recited in claim 9, wherein an additional node is added to the plurality of intermediate nodes, the additional node increasing the system's capacity for processing values from the set of values.

22. A method for configuring a nodal pattern, the method comprising:
    generating successive values at a source node;
    processing the successive values using a plurality of intermediate nodes;
    sending the processed values from a node in the plurality of intermediate nodes to a destination node; and
    configuring the plurality of intermediate nodes such that each intermediate node of the plurality of intermediate nodes concurrently performs at least two actions,
    wherein at least one node of the plurality of intermediate nodes receives a first value associated with a first sub-pattern of the nodal pattern and transmits a second value associated with a second sub-pattern of the nodal pattern.

23. The method recited in claim 22, further comprising receiving a first value according to a first sub-pattern of the nodal pattern, wherein at least one node in the plurality of intermediate nodes is configured to receive the first value according to the first sub-pattern.

24. The method recited in claim 23, further comprising sending a second value according to a second sub-pattern of the nodal pattern, wherein at least one node in the plurality of intermediate nodes is configured to send the second value according to the second sub-pattern.

25. The method recited in claim 22, further comprising selecting the at least two actions from a list of actions including receiving one of the successive values, transmitting the one of the successive values, performing a computation on the one of the successive values, and sending the one of the successive values to a destination node.

26. The method recited in claim 25, further comprising defining a sub-pattern of the nodal pattern according to a schedule of the at least two actions selected from the list of actions.

27. The method recited in claim 22, further comprising at least one node of the plurality of intermediate nodes, receiving an indication included in one value of the successive values, the indication providing handling instructions for the one value.

28. The method recited in claim 22, further comprising:
    replacing each node in the nodal pattern with two nodes, thereby generating a plurality of doubled nodes; and
    processing successive values according to times in a time index, wherein the plurality of doubled nodes processes twice the amount of successive values as could be processed by the plurality of intermediate nodes at any given time in the time index.

29. The method of claim 22, further comprising adding a node to the plurality of intermediate nodes, the additional node increasing the capacity of the system for processing the series of data blocks.

30. A method for configuring a nodal pattern, the method comprising:
    generating a series of data blocks at a source node;
    processing data blocks from the series of data blocks using a plurality of intermediate nodes in data communication with the source node, each intermediate node of the plurality of intermediate nodes being configured to concurrently perform at least two operations;

sending processed data blocks from the plurality of intermediate nodes to a destination node, the destination node being in data communication with the plurality of intermediate nodes;

adding an additional node to the plurality of intermediate nodes; and processing data blocks from the series of data blocks using the plurality of intermediate nodes having the additional node, according to a time index;

wherein the plurality of intermediate nodes having the additional node processes more data blocks than could be processed by the plurality of intermediate nodes.

31. The method recited in claim 30, further comprising configuring each node of the plurality of intermediate nodes to receive and transmit the data blocks.

32. The method recited in claim 30, wherein the series of data blocks is a series of values.

33. The method of claim 30, further comprising replacing each node in the nodal pattern with two nodes, thereby generating a plurality of doubled nodes, wherein the plurality of double nodes is configured to process the series of data blocks faster than the plurality of intermediate nodes.

34. A computer readable storage medium storing computer executable instructions for configuring a nodal pattern by:

generating successive values at a source node;

processing the successive values using a plurality of intermediate nodes;

sending the processed values from an intermediate node in the plurality of intermediate nodes to a destination node; and configuring the plurality of intermediate nodes such that each intermediate node of the plurality of intermediate nodes concurrently performs at least two actions wherein at least one node of the plurality of intermediate nodes receives a first value associated with a first sub-pattern of the nodal pattern and transmits a second value associated with a second sub-pattern of the nodal pattern.

35. A computer readable storage medium storing computer executable instructions for configuring a nodal pattern over a series of time indices in a system comprising a source node, a plurality of intermediate nodes in data communication with the source node, and a destination node in data communication with the plurality of intermediate nodes by:

identifying a source node having a node index i;

generating a series of data blocks at a source node;

during time indices having even values, configuring the intermediate nodes in a first nodal pattern in which a first data block having an index n is sent from the source node to an intermediate node having a node index i+1 and from an intermediate node having a node index i+2 to an intermediate node having a node index i+3, a second data block having an index n−1 is sent from the intermediate node having the index i+1 to the intermediate node having a node index i+2, and a third data block having an index n−2 is sent from the intermediate node having the node index i+3 to the destination node;

during time indices having odd values, configuring the intermediate nodes in a second nodal pattern in which the first data block is sent from the intermediate node having the node index i+1 to the intermediate node having the node index i+3, a fourth data block having an index n+1 is sent from the source node to the intermediate node having the node index i+1 and from the intermediate node having the index i+3 to the intermediate node having the node index i+2, and the second data block is sent from the intermediate node having the node index i+2 to the destination node; and processing data blocks from the series of data blocks during each time index of the series of time indices according to the configured nodal pattern.

* * * * *